United States Patent [19]

Ebihara et al.

[11] Patent Number: 4,541,667
[45] Date of Patent: Sep. 17, 1985

[54] VEHICLE SEAT ARRANGEMENT

[75] Inventors: Sakae Ebihara; Hiroyuki Tanizaki, both of Yokohama; Kazuma Sato, Nagoya; Yuzo Kanazawa, Yokohama, all of Japan

[73] Assignees: Nissan Motor Company, Limited; Aichi Machine Industry Company, Limited; Ikeda Bussan Company, Limited, all of Japan

[21] Appl. No.: 519,732

[22] Filed: Aug. 2, 1983

[30] Foreign Application Priority Data

Sep. 10, 1982 [JP] Japan .................... 57-157575

[51] Int. Cl.⁴ .................................. B60N 1/10
[52] U.S. Cl. ............................ 297/64; 297/251
[58] Field of Search .......... 297/63, 64, 66, 251, 297/415, 381, 376, 414; 296/63, 69, 153; 403/330, 322, 377, 107, 104; 24/643, 647, 665, 650, 672, 664

[56] References Cited

U.S. PATENT DOCUMENTS

| 251,737 | 1/1882 | Schmitz . | |
|---|---|---|---|
| 828,740 | 8/1906 | Hollopeter | 24/585 X |
| 863,874 | 8/1907 | Rajner | 297/115 |
| 1,898,448 | 2/1933 | Hultgren | 297/63 X |
| 2,212,682 | 8/1940 | Epifano . | |
| 2,229,608 | 1/1941 | Ragsdale et al. . | |
| 3,374,011 | 3/1968 | Schipper | 403/377 X |
| 4,148,106 | 4/1979 | Gallien | 297/440 X |

FOREIGN PATENT DOCUMENTS 0004257 1/1980 Japan ........................... 297/64

Primary Examiner—William E. Lyddane
Assistant Examiner—José V. Chen
Attorney, Agent, or Firm—Leydig, Voit & Mayer

[57] ABSTRACT

A first reclining back is pivotally connected to a first seat section. The first back is shiftable to a predetermined position in which the first back is coplanar with the first seat section. The first seat section and back constitute a first seat. A first armrest is detachably connected to the first seat. A second reclining back is pivotally connected to a second seat section. The second back is shiftable to a predetermined position in which the second back is coplanar with the second seat section. The second seat section and back constitute a second seat, which is spaced from the first seat. A second armrest is detachably connected to the second seat. The first and second armrests having been detached from the first and second seats can be used to fill the gap between the first and second seats to form a substantially-flat surface in conjunction with the first and second seats when the first and second backs are in their predetermined positions.

8 Claims, 12 Drawing Figures

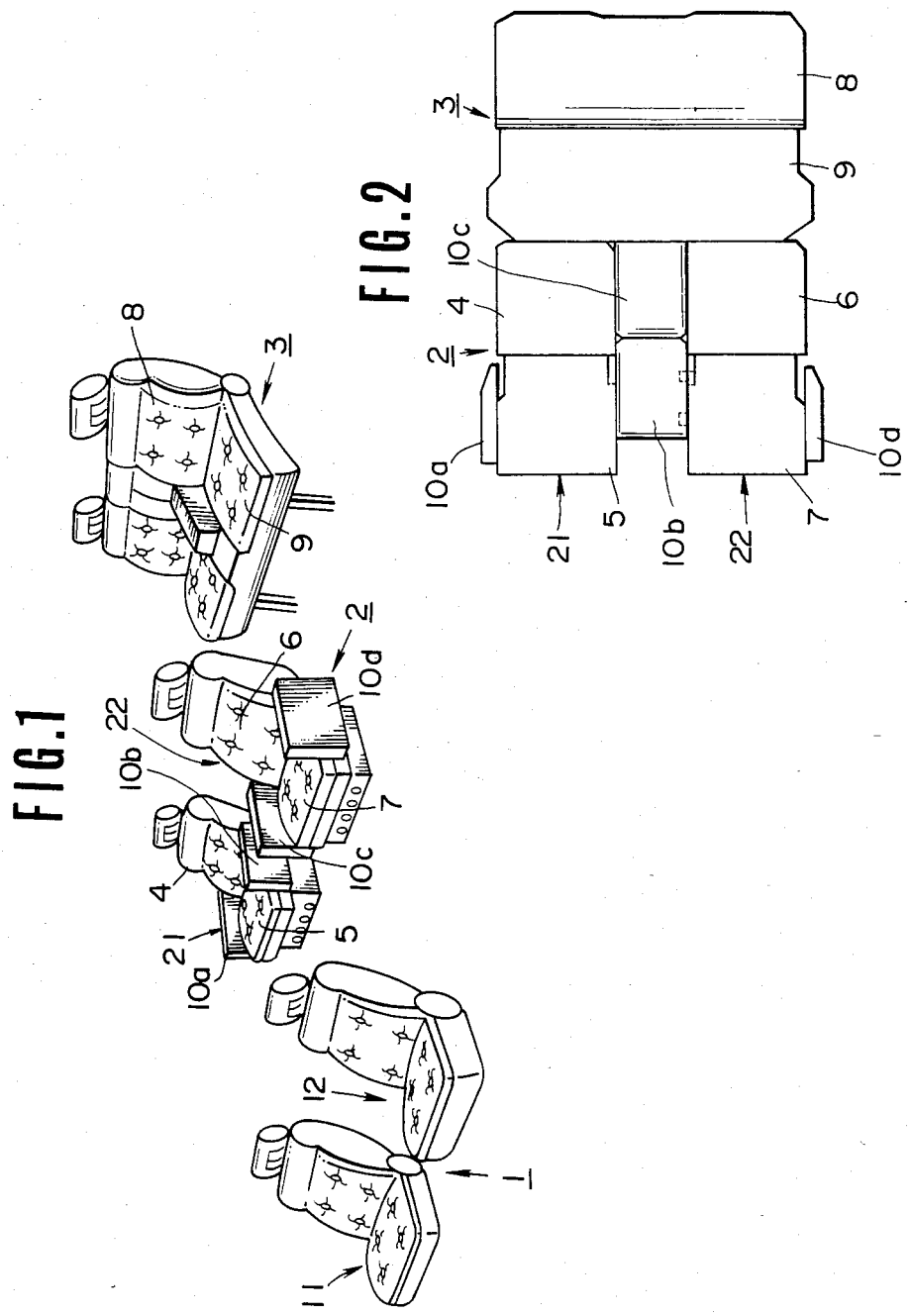

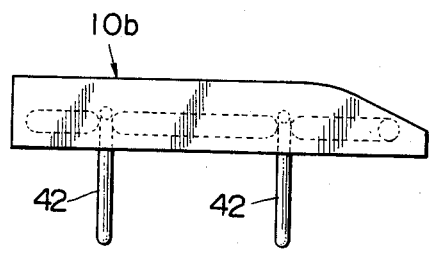
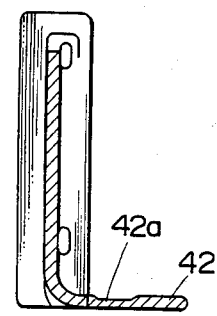
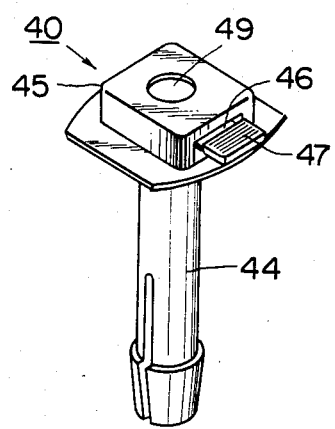
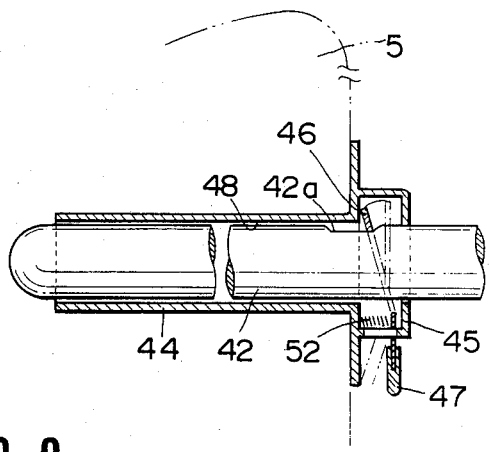
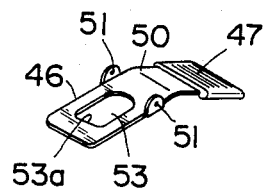

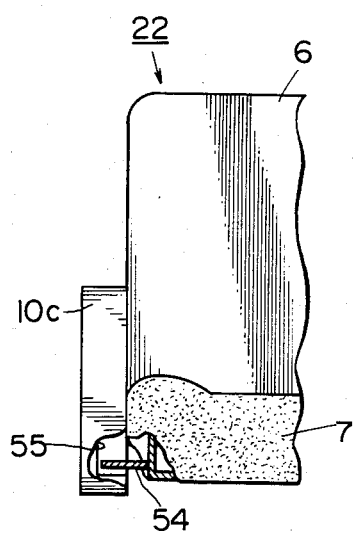
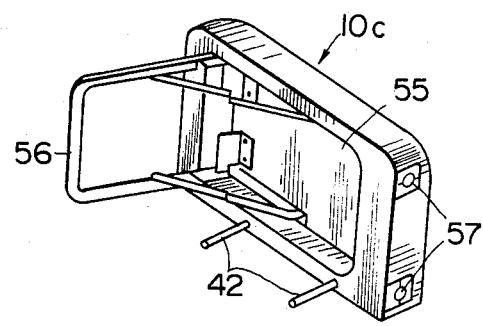
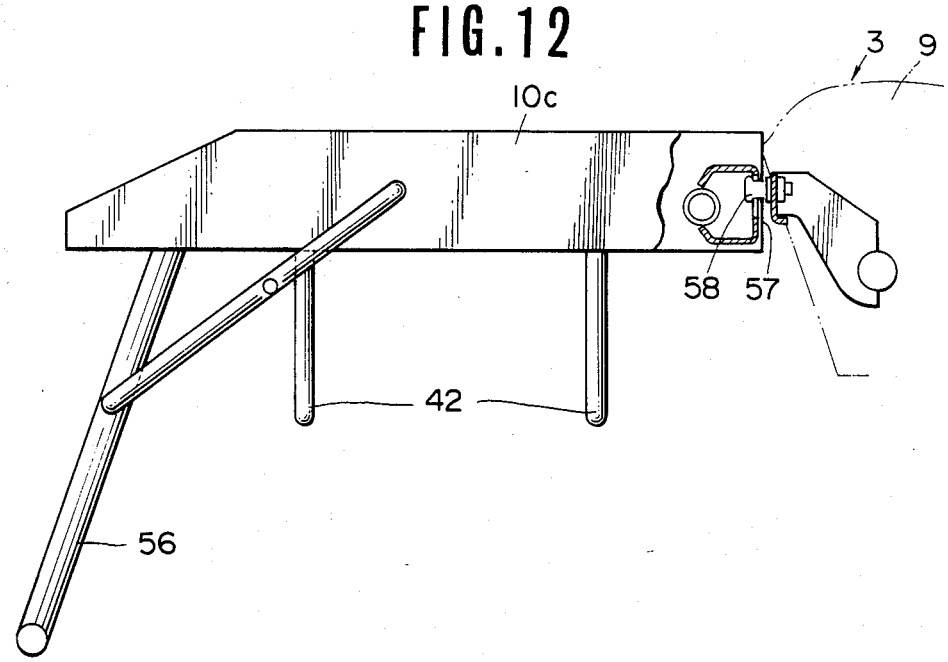

VEHICLE SEAT ARRANGEMENT

BACKGROUND OF THE INVENTION

1. Field of the Invention

This invention relates to a seat arrangement for a vehicle, such as an automobile.

2. Description of the Prior Art

Some wagon-type or panel-van-type passenger automobiles, such as one-box cars, have three transverse lines of seats. Recently, there has been an increasing tendency for the second or intermediate seats to be rotatable through 180° to be able to face the third or rear seat. In some cases, the second and third seats each have a reclining back for comfort.

Generally, bucket or separate seats are more comfortable and safer than bench seats. In addition, in the case of a bench-type rotatable second seat, it is impossible for one seat to face the third seat while the other or others face forward. However, in the case of independently rotatable bucket- or separate-type second seats, the direction of one seat can be changed independently of that of the other seat or seats so that such seats can be used more versatilely.

Such a second independently-rotatable line of seats requires a space or spaces between the seats to enable independent rotation. In the case where these second seats each have a reclining back, when all of the seat backs are lowered or tilted down into a continuous plane alignment with the third seat, the above-mentioned space or spaces form an opening or openings in the flat area defined by the second and third seats. The opening or openings are inconvenient to passengers lying down on the resulting surface.

SUMMARY OF THE INVENTION

It is an object of this invention to provide a convenient seat arrangement for a vehicle, such as an automobile.

In accordance with this invention, a seat arrangement includes spaced first and second seats in side-by-side relationship. The first seat includes a first seat section and a first reclining back pivotally connected to the first seat section. The first back is shiftable to a predetermined position in which the first back is coplanar with the first seat section. The second seat includes a second seat section and a second reclining back pivotally connected to the second seat section. The second back is shiftable to a predetermined position in which the second back is coplanar with the second seat section. A first armrest is detachably connected to the first seat by means of a first device. A second armrest is detachably connected to the second seat by means of a second device. The first and second armrests, when detached from the first and second seats can be used to fill the gap between the first and second seats to form a substantially-flat surface in conjunction with the first and second seats when the first and second backs are in their predetermined positions.

The above and other objects, features and advantages of this invention will be apparent from the following description of a preferred embodiment thereof, taken in conjunction with the drawings.

BRIEF DESCRIPTION OF THE DRAWINGS

FIG. 1 is a perspective view of a seat arrangement of this invention.

FIG. 2 is a top view of the second and third rows of seats of the seat arrangement of FIG. 1 when the associated reclining backs are lowered and the detachable armrests fill the gap between the second seats.

FIG. 5 is a view in the direction of the arrow V in FIG. 4.

FIG. 6 is a cross-sectional view taken along the line VI—VI in FIG. 4.

FIG. 7 is a perspective view of the fastening device of FIG. 3.

FIG. 8 is a perspective view of the engagement member of FIG. 7.

FIG. 9 shows a longitudinal section of the fastening device of FIG. 3 when the stay of FIGS. 5 and 6 is inserted into the fastening device.

FIG. 10 is a front view of part of the left-hand second seat of FIG. 1.

FIG. 11 is a perspective view of the detachable armrest associated with the second seat of FIG. 10.

FIG. 12 is a side view, partially cut-away, of the detachable armrest of FIG. 11 and part of the third seat of FIG. 1 in engagement with each other.

DESCRIPTION OF THE PREFERRED EMBODIMENTS

Figure 3:
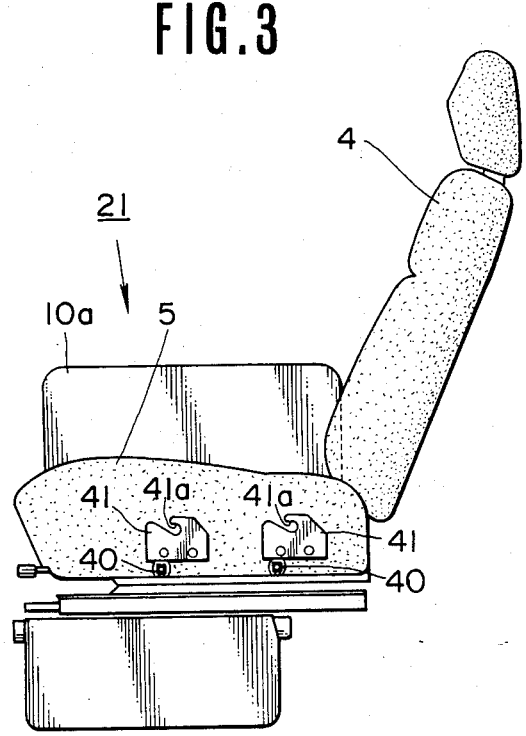
FIG. 3 is a side view of the right-hand second seat of FIG. 1 with the associated detachable armrest removed.

With reference to FIG. 1, a seat arrangement for a vehicle, such as a wagon-type automobile, includes three transverse lines or rows of seats. The front or first row or seat line 1 has separate bucket seats 11 and 12 arranged in side-by-side relationship. The intermediate or second row or seat line 2 has also separate seats arranged in side-by-side relationship, that is, right-hand and left-hand seats 21 and 22. The rear or third row or seat line 3 is of the bench type.

The second row seat 21 includes a horizontal seat section 5 and a reclining back 4 pivotally connected to the seat section 5 in a conventional manner. The other second row seat 22 also includes a seat section 7 and a reclining back 6 pivotally connected thereto. The third row seat 3 is provided with an horizontal common seat section 9 and a common reclining back 8 pivotally connected thereto. The seat sections 5, 7, and 9 are each provided with seat cushions. The second row seat backs 4 and 6 are designed to be able to be lowered or tilted down from their normal positions to their lower limit positions in which the backs 4 and 6 are substantially in continuous horizontal plane alignment with the second and third row seat cushions 5, 7, and 9 when the second row seats 21 and 22 face directly forward. In other words, the backs 4 and 6 are essentially contiguous and coplanar with the seat cushions 5, 7, and 9 when the backs 4 and 6 are in their lower limit positions. The third row seat back 8 is designed to be able to be lowered or tilted down from its normal position to its lower limit position in which the back 8 is substantially in continuous horizontal plane alignment with the seat cushion 9. In other words, the back 8 is essentially contiguous and coplanar with the seat cushion 9. Conventional locks (not shown) are provided to hold the seat backs 4, 6, and 8 at their selected positions relative to the seat cushions 5, 7, and 9, respectively. The second row seats 21 and 22 are independently rotatable about their vertical axes, and are normally spaced to allow independent rotation.

Opposite sides of the second row seat 21 are equipped with armrests 10a and 10b, respectively. Opposite sides of the other second row seat 22 are equipped with armrests 10c and 10d, respectively. The outer armrests 10a and 10d are firmly attached to the seats 21 and 22, respectively. The inner armrests 10b and 10c are detachably connected to the seats 21 and 22, respectively.

When the seat backs 4, 6, and 8 are lowered or tilted down to their lower limit positions described previously, the upper surfaces of the seat cushions 5, 7, and 9 form a substantially-flat horizontal surface in conjunction with the resulting upper surfaces of the seat backs 4, 6, and 8. In this case, the detachable inner armrests 10b and 10c can be manually shifted from their normal positions to second positions in which they fill the opening in the above-mentioned horizontal surface resulting from the spacing between the second row seats 21 and 22 to complete the horizontal surface, as shown in FIG. 2. Toward this end, the horizontally-aligned combination of the armrests 10b and 10c has a surface designed to conform to that of the opening in the horizontal surface. In other words, the combination of the armrests 10b and 10c is of dimensions matching the opening in the horizontal surface. This resulting complete or copolanar horizontal surface enables the second and third seat lines 2 and 3 to be used as a comfortable bed or the like. Therefore, this seat arrangement is more convenient than conventional arrangements.

The tops of the seat backs 4, 6, and 8 may be provided with detachable headrests. When the seat backs 4, 6, and 8 are to be lowered to form the horizontal surface in conjunction with the seat cushions 5, 7, and 9, the headrests are first manually detached from the seat backs 4, 6, and 9.

Figure 4:
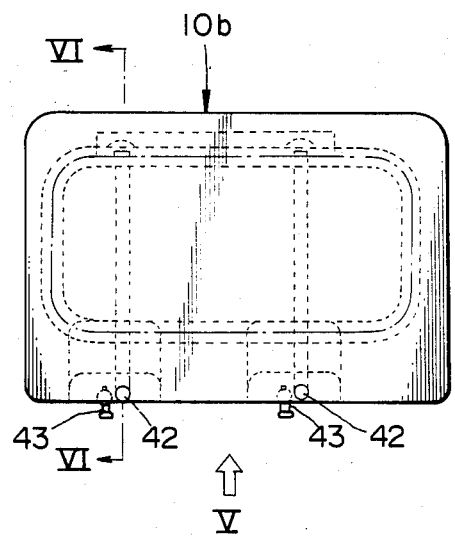
FIG. 4 is a side view of the detachable armrest associated with the second seat of FIG. 3.

As shown in FIG. 3, the inner side of the seat cushion 5 of the right-hand second row seat 21 is provided with a pair of fastening devices 40. As shown in FIGS. 4 to 6, the armrest 10b is provided with a pair of fixed parallel stays 42 protruding perpendicularly from the inner side of the armrest 10b. The fasteners 40 and the stays 42 are designed to engage each other to detachably connect the armrest 10b to the seat cushion 5 in its normal position. Specifically, the stays 42 can be inserted into the fasteners 40 for engagement.

FIGS. 7 to 9 show details of one of the fasteners 40. The fastener 40 includes a supporting sleeve 44 and a casing 45 fixed securely to one end of the sleeve 44. The sleeve 44 securely fits into a hole formed in the seat cushion 5 to fix the fastener 40 to the seat cushion 5. The sleeve 44 accommodates and supports the stay 42 when the armrest 10b is in its normal, inserted position. When the armrest 10b is shifted into and out of its normal position, the stay 42 is inserted into and withdrawn from the sleeve 44 while being guided by the latter. The casing 45 houses an engagement member 46, through which the stay 42 can pass. Part of the member 46 projecting from the casing 45 is provided with an operating handle 47. The center of the casing 45 has a hole 49 extending therethrough and coaxially aligned with the central bore 48 through the sleeve 44. The stay 42 is inserted through and into the hole 49 and the bore 48 when the armrest 10b is shifted to its normal position. The engagement member 46 is bent along a line denoted by the numeral 50, and is provided with a pair of tabs 51 near the bend 50. The tabs 51 are pivotally connected to the inner surfaces of the casing 45, so that the engagement member 46 can pivot about the tabs 51. The casing 45 is preferably provided with a pair of inwardly-projecting pins rotatably extending through the tabs 51 respectively to achieve pivotal connection between the casing 45 and the engagement member 46. The casing 45 has an opening through which the operating handle 47 of the engagement member 46 projects outwardly. This opening is of such dimensions as to allow the engagement member 46 to pivot through a predetermined range. A spring 52 housed within the casing 45 seats between the casing 45 and the engagement member 46 to urge the engagement member 46 in one direction. Each of the stays 42 is formed with a recess or groove 42a. The engagement member 46 has an opening 53, through which the stay 42 can extend. When the armrest 10b is in its normal position, the distal wall 53a of the opening 53 engages the stay 42 at one end of the groove 42a.

One of the stays 42 may simply be inserted into a hole (not shown) formed in the seat cushion 5 rather than into a fastener 40.

Withdrawing the stay 42 from the fastener 40 to detach the armrest 10b from its normal position with respect to the seat cushion 5 is performed as follows: when the stay 42 is pulled gently and the operating handle 47 is depressed against the force of the spring 52, the part of the engagement member 46 defining the distal wall 53a is pivoted from its engaging position inside the groove 42a to a position outside the groove 42a in which the engagement member 46 allows free longitudinal movement of the stay 42. Maintaining the engagement member 46 in this position by holding the operating handle 47 depressed enables the stay 42 to be withdrawn from the device 40.

When the stay 42 is inserted into the fastener 40, the engagement member 46 engages the stay 42 at one end of the groove 42a. In this case, the distal wall 53a is located within the groove 42a, so that the engagement member 46 firmly engages the stay 42 at the near end of the groove 42a to prevent longitudinal movement of the stay 42 in case the stay 42 is pulled while the operating handle 47 is not depressed. Thus, the engagement member 46 cooperates with the groove 42a to constitute a lock for preventing the stay 42 from falling out of the fastener 40. When the operating handle 47 is depressed against the force of the spring 52, the engagement member 46 can be pivoted to move the distal wall 53a out of the groove 42a so that the opening 53 allows free longitudinal movement of the stay 42. The engagement member 46 can be easily moved out of the groove 42a. Thus, depressing the operating handle 47 against the force of the spring 52 disables the above-mentioned lock.

The fastener 40 may be attached to any point along the inner side surface of the seat cushion 5. For example, the fastener 40 may be attached to the frame of the seat cushion 5 or to a sliding mechanism thereof.

As shown in FIG. 3, the inner side section or of the seat cushion 5 of the second seat 21 is provided with a pair of fixed supports 41. As shown in FIG. 4, the bottom of the armrest 10b is provided with a pair of projections 43 designed to engage the supports 41 respectively. Specifically, the supports 41 have grooves 41a which can accommodate the projections 43. The projections 43 are intended to engage the supports 41 when the armrest 10b is shifted from the normal position to the second position in which the armrest 10b fills the opening between the second row seats 21 and 22.

As shown in FIG. 10, the inner armrest 10c of the left-hand second seat 22 is detachably connected to the inner side of the seat cushion 7. A mechanism for effecting the detachable connection of the armrest 10c to the seat cushion 7 is designed in a manner similar to that associated with the right-hand second seat 21. Specifically, the inner side of the armrest 10c is provided with a pair of stays 42 (see FIGS. 11 and 12), which engage fastening devices (not shown) on the side of the seat cushion 7 to hold the armrest 10c in place against the seat cushion 7 when the armrest 10c is in its normal position.

Returning to FIG. 10, a pair of supports 54 are attached to the inner side of the seat cushion 7. The armrest 10c is formed with a recess 55 for accommodating the supports 54 projecting outward from the inner side of the seat cushion 7 when the armrest 10c is in its normal position. As shown in FIG. 11, the recess 55 is formed on the inner side of the armrest 10c. The recess 55 is designed to be able to accommodate a folding leg 56 pivotally connected to the armrest 10c. A pair of engagement holes 57 is formed on the rear face of the armrest 10c. As shown in FIG. 12, the front end of the third seat 9 is provided with a pair of projections 58 designed to be inserted into the engagement holes 57 respectively.

The seat arrangement is changed from the normal position as shown in FIG. 1 to the fully flat position as shown in FIG. 2 by the following steps: first, the seat backs 4, 6 and 8 are lowered. In the case of seats having headrests, the headrests are detached from the seat backs 4, 6, and 8 before they are lowered. Second, the inner armrests 10b and 10c are detached from the second seat row seats 21 and 22, respectively. As shown in FIG. 12, the leg 56 is moved from the recess 55 to its operative position, and the armrest 10c is shifted or moved to its second position in which the armrest 10c substantially fills the opening between the backs 4 and 6 of the second seat row seats 21 and 22. In this case, the lower end of the leg 56 abuts the floor of the vehicle. Shifting the armrest 10c from the normal to the second position includes rotation of the armrest 10c through 90° about its longitudinal axis. In view of this fact, the side surface of the armrest 10c conforms to the horizontal contour of the opening between the backs 4 and 6 so that the armrest 10c can snugly fit in the opening. In other words, the side of the armrest 10c is of dimensions matching the horizontal contour of the opening between the backs 4 and 6. The projections 58 are inserted into the engagement holes 57 so that the armrest 10c engages the third seat 9. The engagement of the armrest 10c with the third seat 9 and with the vehicle floor via the leg 56 serves to support the armrest 10c. Then, the other armrest 10b is shifted or moved to its second position in which the armrest 10b substantially fills the opening between the seat cushions 5 and 7 of the second seats 21 and 22. Shifting the armrest 10b from the normal to the second position includes rotation of the armrest 10b through 90° about its longitudinal axis. In view of this fact, the side surface of the armrest 10b conforms to the horizontal contour of the opening between the seat cushions 5 and 7 so that the armrest 10b can snugly fill the opening. In other words, the side or width when rotated 90 degrees of the armrest 10b is of dimensions matching the horizontal contour of the opening between the seat cushions 5 and 7. The projections 43 are connected to the supports 41 while the other side of the armrest 10b rests on the supports 54. In this way, the armrest 10b is supported in place.

It should be understood that further modifications and variations may be made in this invention without departing from the spirit and scope of this invention as set forth in the appended claims.

What is claimed is:

1. A seat arrangement comprising:
 (a) a first seat, the first seat comprising:
  (a1) a first seat section, and
  (a2) a first reclining back pivotally connected to the first seat section, the first back being shiftable to a predetermined position in which the first back is coplanar with the first seat section;
 (b) a first armrest detachably connected to one side of said first seat;
 (c) means for detachably connecting the first armrest to the first seat;
 (d) a second seat spaced laterally from the first seat, the second seat comprising:
  (d1) a second seat section; and
  (d2) a second reclining back pivotally connected to the second seat section, the second back being shiftable to a predetermined position in which the second back is coplanar with the second seat section;
 (e) a second armrest detachably connected to the side of said second seat which is adjacent said first seat and said first armrest;
 (f) means for detachably connecting the second armrest to the second seat;
 (g) a third seat spaced longitudinally from the laterally arranged first and second seats, the third seat comprising:
  (g1) a third seat section; and
  (g2) a third reclining back pivotally connected to the third seat section, the third back being shiftable to a predetermined position in which the third back is coplanar with the third seat section, the third seat section being contiguous and coplanar with the first and second backs when the first and second backs are in their predetermined positions and the first and second armrests having at least one dimension coinciding with the space between the first and second seats and are adapted to form a substantially coplanar horizontal surface intermediate and in conjunction with the first and second seats with one of said first and second armrests abutting said third seat section when the first and second backs are arranged in their predetermined positions and the armrests are detached from the respective seats and inserted in the space.

2. A seat arrangement as recited in claim 1, further comprising:
 (a) a leg pivotally connected to the first armrest;
 (b) means for detachably connecting the first armrest to a region of the third seat section proximate to said first and second seats;
 (c) the leg and the means for detachably connecting the first armrest to the third seat being designed to maintain the first armrest in place when the first armrest is inserted in the space;
 (d) means for detachably and horizontally connecting the second armrest to the second seat section; and
 (e) means for supporting the second armrest associated with the first seat section;
 (f) said means for connecting the second armrest to the second seat section and said means for supporting the second armrest being designed to hold the second armrest in place when the second armrest is inserted in the spacing.

3. A seat arrangement as recited in claim 1, wherein each of the means for detachably connecting the armrests to their respective seats comprises:
   (a) a stay fixed to the associated armrest;
   (b) a sleeve fixed to the associated seat section for accomodating the stay; and
   (c) a lock for releasably holding the stay in a predetermined position relative to the sleeve.

4. A seat arrangement as recited in claim 3, wherein the lock comprises:
   (a) an engagement member pivotally connected to the sleeve, the engagement member having an opening through which the stay can extend; and
   (b) a spring for urging the engagement member with respect to the sleeve;
   (c) the stay having a groove, one edge of the opening being engageable with one wall of the groove to hold the stay in its predetermined position relative to the sleeve, the stay being movable out of the predetermined position when the engagement member is pivoted against the force of the spring.

5. A seat arrangement for a vehicle, such as an automobile, comprising:
   (a) a first seat, the first seat comprising:
      (a1) a first seat section, and
      (a2) a first reclining back pivotally connected to the first seat section, the first back being shiftable to a predetermined position in which the first back is coplanar with the first seat section;
   (b) a first armrest detachably connected to one side of said first seat;
   (c) means for detachably connecting the first armrest to the first seat;
   (d) a second seat spaced laterally from the first seat, the second seat comprising:
      (p1) a second seat section, and
      (d2) a second reclining back pivotally connected to the second seat section, the second back being shiftable to a predetermined position in which the second back is coplanar with the second seat section;
   (e) a second armrest detachably connected to the side of said second seat which is adjacent said first seat and said first armrest;
   (f) means for detachably connecting the second armrest to the second seat;
   (g) a third seat spaced longitudinally from the laterally arranged first and second seats, the third seat comprising:
      (g1) a third seat section; and
      (g2) a third reclining back pivotally connected to the third seat section, the third back being shiftable to a predetermined position in which the third back is coplanar with the third seat section, the third seat section being contiguous and coplanar with the first and second backs when the first and second backs are in their predetermined positions and the first and second armrests having at least one dimension coinciding with the space between the first and second seats and are adapted to form a substantially coplanar horizontal surface intermediate in conjunction with the first and second seats with one of said first and second armrests abutting said third seat section when the first and second backs are arranged to their predetermined positions and the armrests are detached from the respective seats and inserted in the space.

6. A seat arrangement as recited in claim 5, further comprising:
   (a) a leg pivotally connected to the first armrest;
   (b) means for detachably connecting the first armrest to a region of the third seat section proximate to said first and second seats;
   (c) the leg and the means for detachably connecting the first armrest to the third seat being designed to maintain the first armrest in place when the first armrest is inserted in the space;
   (d) means for detachably and horizontally connecting the second armrest to the second seat section; and
   (e) means for supporting the second armrest associated with the first seat section;
   (f) said means for connecting the second armrest to the second seat section and said means for supporting the second armrest being designed to hold the second armrest in place when the second armrest is inserted in the spacing.

7. A seat arrangement as recited in claim 5, wherein each of the means for detachably connecting the armrests to their respective seats comprises:
   (a) a stay fixed in the associated armrest;
   (b) a sleeve fixed to the associated seat section for accomodating the stay; and
   (c) a lock for releasably holding the stay in a predetermined position relative to the sleeve.

8. A seat arrangement as recited in claim 7, wherein the lock comprises:
   (a) an engagement member pivotally connected to the sleeve, the engagement member having an opening through which the stay can extend; and
   (b) a spring for urging the engagement member with respect to the sleeve;
   (c) the stay having a groove, one edge of the opening being engageable with one wall of the groove to hold the stay in its predetermined position relative to the sleeve, the stay being movable out of the predetermined position when the engagement member is pivoted against the force of the spring.

* * * * *